US011800283B2

(12) United States Patent
Gwock

(10) Patent No.: US 11,800,283 B2
(45) Date of Patent: Oct. 24, 2023

(54) METHOD AND APPARATUS FOR CONTROLLING AUDIO USING ASYMMETRIC CHANNEL OF AUDIO CONFERENCE

(71) Applicant: LINE Plus Corporation, Seongnam-si (KR)

(72) Inventor: Jungnam Gwock, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 17/830,681

(22) Filed: Jun. 2, 2022

(65) Prior Publication Data

US 2022/0295182 A1 Sep. 15, 2022

Related U.S. Application Data

(63) Continuation of application No. 16/992,259, filed on Aug. 13, 2020, now Pat. No. 11,381,914.

(30) Foreign Application Priority Data

Aug. 14, 2019 (KR) .................. 10-2019-0099577

(51) Int. Cl.
*H04R 3/04* (2006.01)
*H04S 7/00* (2006.01)
(Continued)

(52) U.S. Cl.
CPC ........... *H04R 3/04* (2013.01); *H04L 12/1813* (2013.01); *H04L 65/403* (2013.01); *H04L 65/65* (2022.05);
(Continued)

(58) Field of Classification Search
CPC ..... H04S 2400/13; H04S 7/00; H04L 65/601; H04L 65/1069; H04L 12/18; H04R 2430/01; H04R 3/04
(Continued)

(56) References Cited

U.S. PATENT DOCUMENTS 10,819,953 B1 * 10/2020 Lovitt ................... G06F 16/487
2011/0069643 A1 * 3/2011 Yoakum .............. H04L 65/4015
370/261

FOREIGN PATENT DOCUMENTS

KR 101134581 B1 4/2012

* cited by examiner

*Primary Examiner* — Yosef K Laekemariam
(74) *Attorney, Agent, or Firm* — Harness, Dickey & Pierce, P.L.C.

(57) ABSTRACT

Disclosed are methods and systems for controlling audio using an asymmetric channel of an audio conference. An audio control method may include establishing, by a processor included in a computer apparatus, a bi-directional media session having an asymmetric channel structure between a first participant among a plurality of participants participating in an audio conference and a mixer, receiving, by the processor, first audio data from the first participant through a media session of a first channel structure in the bi-directional media session, mixing, by the processor, second audio data of at least two participants excluding the first participant from among the plurality of participants, using a multichannel, and transferring, by the processor, the mixed audio data of the at least two participants mixed using the multichannel to the first participant through a media session of a second channel structure in the bi-directional media session.

19 Claims, 8 Drawing Sheets

(51) Int. Cl.
    *H04L 12/18*         (2006.01)
    *H04L 65/65*         (2022.01)
    *H04L 65/70*         (2022.01)
    *H04L 65/75*         (2022.01)
    *H04L 65/403*       (2022.01)

(52) U.S. Cl.
    CPC .............. *H04L 65/70* (2022.05); *H04L 65/75* (2022.05); *H04S 7/307* (2013.01); *H04R 2430/01* (2013.01); *H04S 2400/01* (2013.01); *H04S 2400/13* (2013.01)

(58) Field of Classification Search
    USPC ..................................... 381/58, 80, 104, 119
    See application file for complete search history.

METHOD AND APPARATUS FOR CONTROLLING AUDIO USING ASYMMETRIC CHANNEL OF AUDIO CONFERENCE

CROSS-REFERENCE TO RELATED APPLICATION

This U.S. non-provisional application is a continuation of U.S. application Ser. No. 16/992,259, filed on Aug. 13, 2020, which claims the benefit of priority under 35 U.S.C. § 119 to Korean Patent Application No. 10-2019-0099577, filed Aug. 14, 2019, the entire contents of each of which are incorporated herein by reference in their entirety.

BACKGROUND

Technical Field

One or more example embodiments relate to methods, systems, and/or non-transitory computer-readable record mediums for controlling audio using an asymmetric channel of an audio conference.

Related Art

An audio conference (audio conferencing) refers to a type of teleconference in which participants conduct a meeting through audio transmission in their respective offices or workplaces instead of gathering at a conference hall. In addition to teleconference using only audio data, a video conference (video conferencing) also delivers audio data with a multiway call in which a plurality of users simultaneously makes calls, and exchange an image and/or a media file. Accordingly, such video conference may be included in the category of the audio conference. That is, the audio conference may include any type of calls in which audio is delivered.

Here, in the case of the existing audio conference using mixing, a user in a listener's position may not control each audio source. For example, audio streams of a plurality of different audio sources are mixed. Thus, a server may control the individual audio streams before mixing the audio streams, but a user receiving a mixed audio stream may not control an individual audio stream of a specific audio source.

SUMMARY

Some example embodiments provide an audio control methods and/or systems that allows a user in a listener's position to control audio for each audio data source while using mixing in an audio conference.

According to an aspect of at least one example embodiment, an audio control method of a computer apparatus including at least one processor may include establishing, by the at least one processor, a bi-directional media session having an asymmetric channel structure between a first participant among a plurality of participants participating in an audio conference and a mixer, receiving, by the at least one processor, first audio data from the first participant through a media session of a first channel structure in the bi-directional media session, mixing, by the at least one processor, second audio data of at least two participants excluding the first participant from among the plurality of participants, using a multichannel, and transferring, by the at least one processor, the mixed second audio data of the at least two participants mixed using the multichannel to the first participant through a media session of a second channel structure in the bi-directional media session.

The first channel structure may include a mono channel structure, and the second channel structure may include a multichannel structure.

The establishing may include determining at least one of a channel type, a channel coding scheme, and a processing unit of audio data for each direction by exchanging media processing information with the first participant.

The establishing may include determining a channel type between a fixed channel and a variable channel and a number of channels.

The establishing may include determining a channel coding scheme as one of a codec coding that uses a codec supporting a multichannel encoding and an iterated coding that represents the multichannel based on a processing unit of audio data, in response to setting the media session of the second channel structure to the multichannel.

The establishing may include determining a processing unit of audio data for an iterated coding, in response to using the iterated coding as a channel coding scheme.

The first participant and the mixer may communicate according to a transfer protocol of a real-time transport protocol (RTP), and, in response to setting the media session of the second channel structure to the multichannel, an order of a channel may be represented through an order of a synchronization source (SSRC) represented in a contributing source (CSRC) defined according to the transfer protocol of the RTP, and a number of channels may be represented through a CSRC count defined according to the transfer protocol of the RTP.

The transferring may include transmitting the mixed second audio data of the at least two participants including n participants, through n channels as the multichannel, where n denotes a natural number of 2 or more.

The audio control method further may further include classifying at least two participants into m groups, where m denotes a natural number of 2 or more, and the transferring may include transmitting the mixed second audio data of the at least two participants for each group through m channels formed for the m groups.

According to an aspect of at least one example embodiment, an audio control method of a computer apparatus including at least one processor may include establishing, by the at least one processor, a bi-directional media session having an asymmetric channel structure between a mixer included in a server providing an audio conference and a first participant, transmitting by the at least one processor, first audio data of the first participant to the mixer through a media session of a first channel structure in the bi-directional media session, receiving, by the at least one processor, from the mixer that is configured to mix two or more pieces of audio data of a plurality of participants using a multichannel, second audio data of at least two participants from among the plurality of participants mixed using the multichannel through a media session of a second channel structure in the bi-directional media session, the at least two participants excluding the first participant, and individually controlling, by the at least one processor, a specific piece of the mixed second audio data of a select channel selected from the multichannel.

The individually controlling may include at least one of controlling a volume of the specific piece of the mixed second audio data of the select channel, removing noise in the specific pieces of the audio data of the select channel, or modulating the specific piece of the second audio data of the select channel.

According to an aspect of at least one example embodiment, there is provided a non-transitory computer-readable record medium storing instructions that, when executed by the at least one processor, cause the at least one processor to implement the aforementioned audio control method.

According to an aspect of at least one example embodiment, there is provided a computer apparatus including at least one processor configured to execute a computer-readable instruction. The at least one processor may be configured to establish a bi-directional media session having an asymmetric channel structure between a first participant among a plurality of participants participating in an audio conference and a mixer, receive first audio data from the first participant through a media session of a first channel structure in the bi-directional media session, mix second audio data of at least two participants excluding the first participant from among the plurality of participants, using a multichannel, and transfer the second audio data of the at least two participants mixed using the multichannel to the first participant through a media session of a second channel structure in the bi-directional media session.

According to an aspect of at least one example embodiment, there is provided a computer apparatus including at least one processor configured to execute a computer-readable instruction. The at least one processor may be configured to establish a bi-directional media session having an asymmetric channel structure between a mixer included in a server providing an audio conference and a first participant, transmit first audio data of the first participant to the mixer through a media session of a first channel structure in the bi-directional media session, receiving from the mixer that is configured to mix two or more pieces of audio data of a plurality of participants from among the plurality of participants using a multichannel, second audio data of at least two participants from among the plurality of participants, mixed using the multichannel through a media session of a second channel in the bi-directional media session, the at least two participants excluding the first participant, and individually control a specific piece of the mixed second audio data of a select channel selected from the multichannel.

According to some example embodiments, a user in a listener's position may control audio for each audio data source while using a mixing capability associated with an audio conference service.

Further areas of applicability will become apparent from the description provided herein. The description and specific examples in this summary are intended for purposes of illustration only and are not intended to limit the scope of the present disclosure.

DETAILED DESCRIPTION

Figure 1:
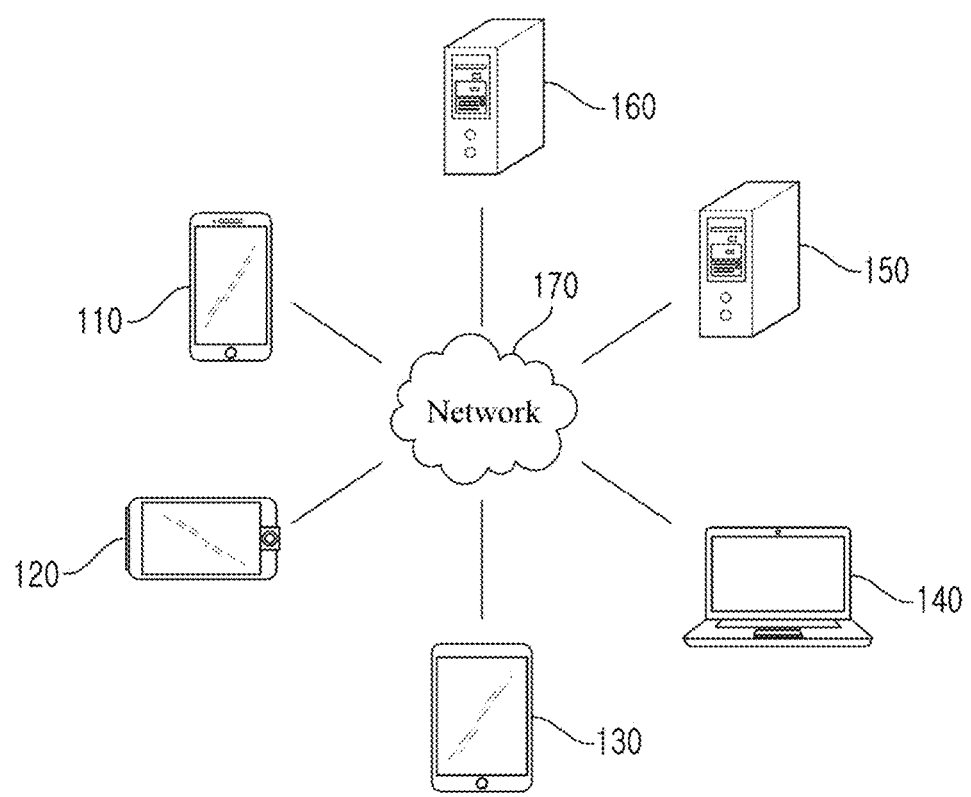
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device (or alternatively processing device), may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of the disclosed example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

An audio control system according to example embodiments may be implemented by at least one computer apparatus, and an audio control method according to example embodiments may be performed through at least one computer apparatus included in the audio control system. Here, a computer program according to some example embodiments may be installed and executed on the computer apparatus and the computer apparatus may perform the audio control method under control of the executed computer program. The computer program may be stored in a non-transitory computer-readable record medium to implement the audio control method on a computer in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example only among environments applicable to example embodiments. Environments applicable to the example embodiments are not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service to the plurality of electronic devices 110, 120, 130, and 140 connected over the network 170. Here, the service may include, for example, an audio conferencing service, a messaging service, a mail service, a social network service (SNS), a map service, a translation service, a financial service, a payment service, a search service, and a content providing service.

Figure 2:
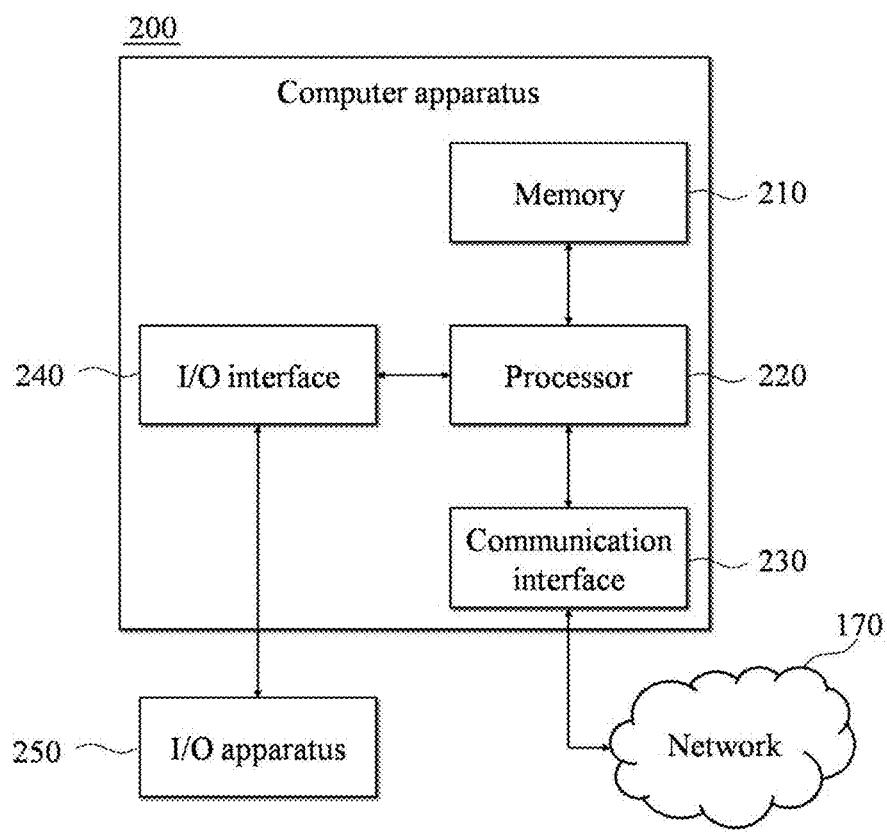
FIG. 2 is a diagram illustrating an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as random access memory (RAM), a read only memory (ROM), and a disk drive, as a non-transitory computer-readable storage medium. The permanent mass storage device, such as ROM and disk drive, may be included in the computer apparatus 200 as a permanent storage device separate from the memory 210. Also, an OS and at least one program code may be stored in the memory 210. The software components may be loaded to the memory 210 from another non-transitory computer-readable medium separate from the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230 instead of, or in addition to, the non-transitory computer-readable storage medium. For example, software components may be loaded to the memory 210 of the computer apparatus 200 based on a computer program installed by files received over the network 170.

The processor 220 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 of the electronic apparatus 200 may transfer data, a file, a request or an instruction created based on the program code stored in the storage device, such as the memory 210, to other apparatuses over the network 170 under control of the communication interface 230. Further, a signal, an instruction, data, a file, etc., from the other apparatus may be received at the computer apparatus 200 through the communication interface 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent mass storage device, further includable in the computer apparatus 200.

The I/O interface 240 may be an interface with an I/O apparatus 250. For example, an input device included in the I/O apparatus 250 may include a device, such as a microphone, a keyboard, a mouse, and the like, and an output device included in the I/O apparatus 250 may include a device, such as a display, a speaker, and the like. As another example, the I/O interface 240 may be an interface with the I/O apparatus 250 in which an input function and an output function are integrated into a single function, such as a touchscreen. The I/O apparatus 250 may be configured as a single apparatus with the computer apparatus 200.

According to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

Figure 3:
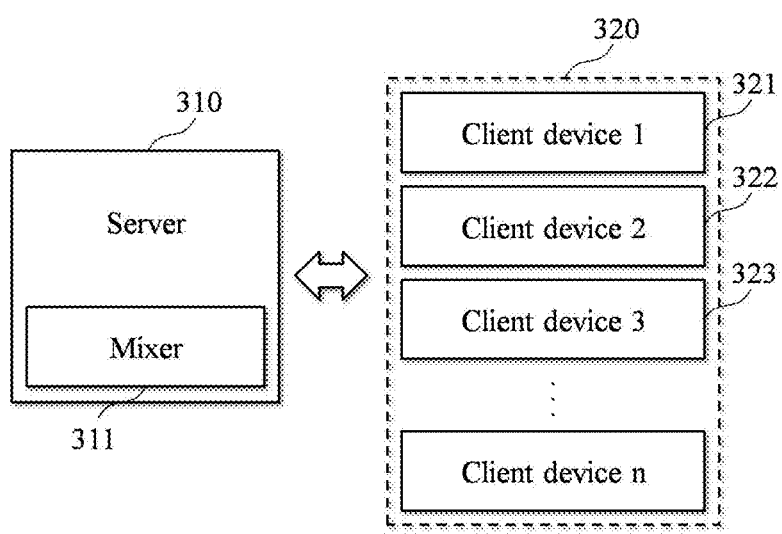
FIG. 3 is a diagram illustrating an example of an audio control system according to at least one example embodiment.

FIG. 3 is a diagram illustrating an example of an audio control system according to at least one example embodiment. The audio control system according to the example embodiment may include a server 310 configured to provide an audio conferencing service and client devices 320 for a plurality of participants. Here, the server 310 may include a mixer 311 and may mix audio data of other participants participating in the same audio conference and deliver the mixed audio data to a first participant participating in the audio conference. For example, with the assumption that a client device 1 321, a client device 2 322, and a client device 3 323 among the client devices 320 participate in a single audio conference instance, the server 310 may mix first audio data received from the client device 1 321 and second audio data received from the client device 2 322 through the mixer 311, and may transfer the mixed audio data to the client device 3 323.

For example, the mixer 311 may be a software module generated at the server 310 for a single audio conference instance and configured to relay audio data between participants participating in the corresponding audio conference instance. Here, the mixer 311 may establish a bi-directional media session with each of the participants of the corresponding audio conference instance. For example, the mixer 311 according to the example embodiment may establish a bi-directional media session of an asymmetric channel structure such that each of the participants may control individual audio data in the mixed audio data.

Figure 4:
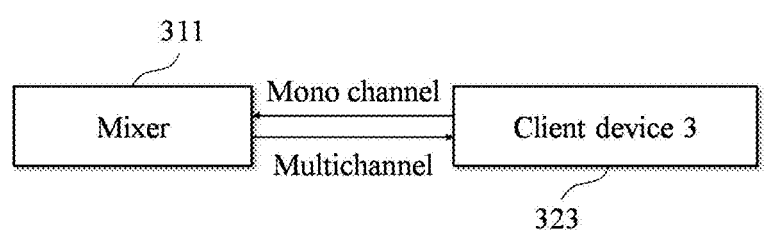
FIG. 4 is a diagram illustrating an example of a bi-directional media session of an asymmetric channel structure according to at least one example embodiment.

FIG. 4 illustrates an example of a bi-directional media session of an asymmetric channel structure according to at least one example embodiment. An example in which a bi-directional media session of an asymmetric channel structure is established between the mixer 311 and the client device 3 323 is described with reference to FIG. 4. Referring to FIG. 4, because the client device 3 323 transmits its audio data to the mixer 311, a media session in a direction from the client device 3 323 to the mixer 311 may be set in a mono channel structure. Further, a media session in a direction from the mixer 311 to the client device 3 323 may be set in a mono channel structure in the case of simply receiving mixed audio data. In this case, because the individual audio data of the respective participants may not be distinguished from the mixed mono channel audio data, the individual audio data may not be controlled for each participant. Therefore, to control the individual audio data, the media session in the direction from mixer 311 to the client device 3 323 may be set in a multichannel structure. The bi-directional media session of the asymmetric channel structure may be set for a client device that desires to control the individual audio data. That is, client devices that do not desire to control the individual audio data may establish a bi-directional media session of a simple mono channel structure with the mixer 311.

Figure 5:
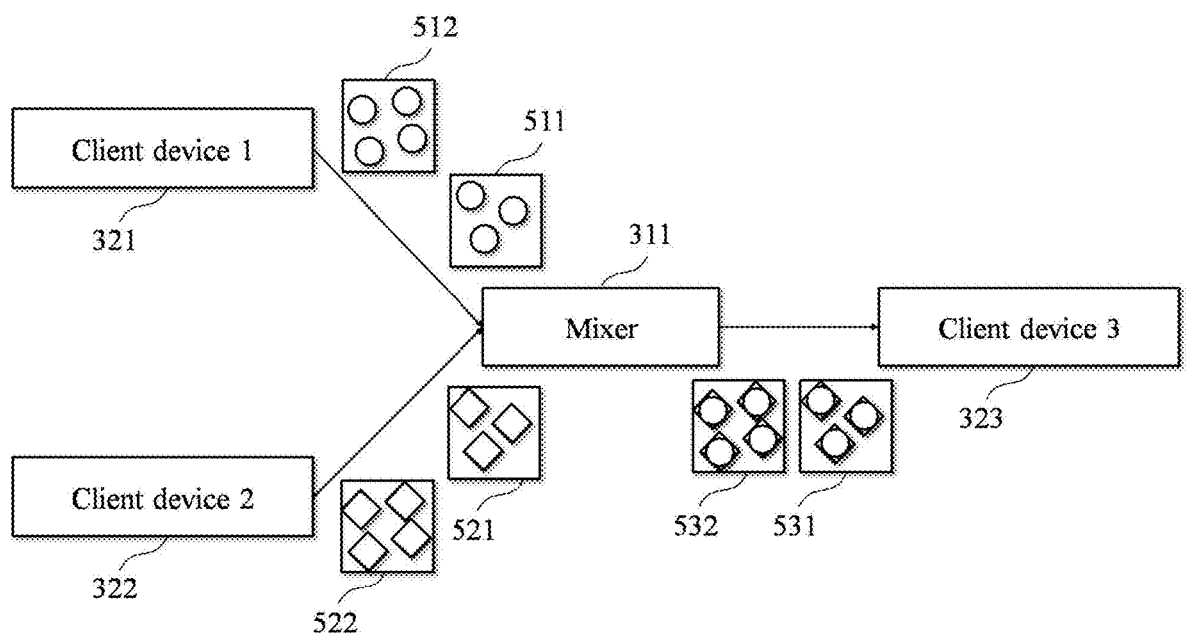
FIG. 5 illustrates an example of receiving mixed audio data through a media session of a mono channel structure according to at least one example embodiment.
Figure 6:
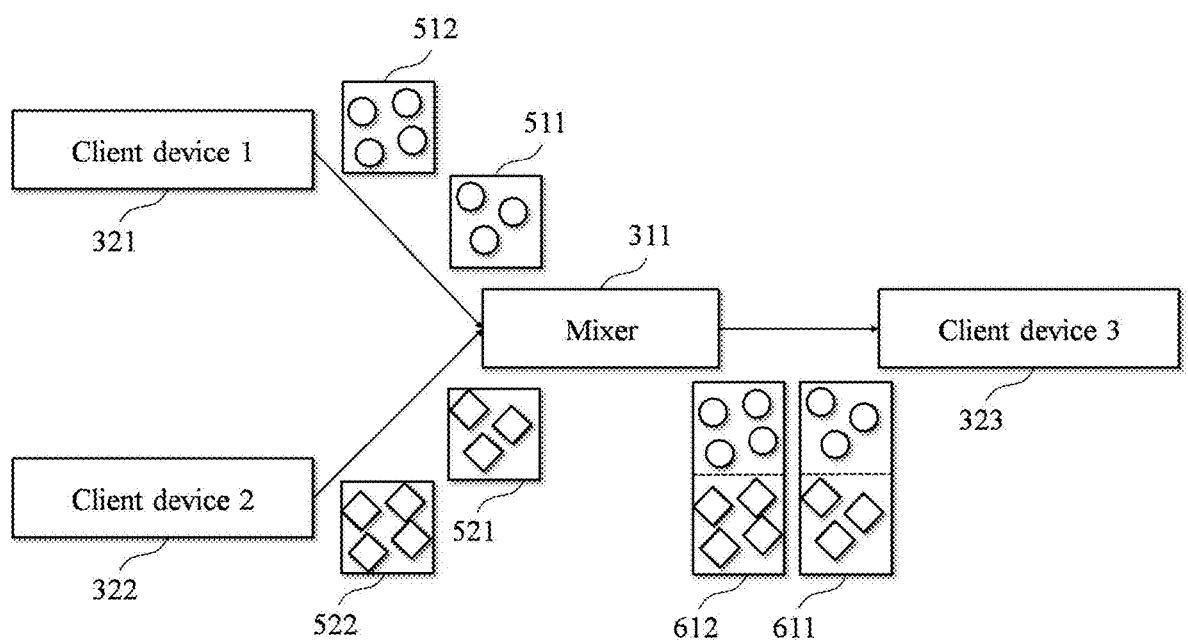
FIG. 6 illustrates an example of receiving mixed audio data through a media session of a multichannel structure according to at least one example embodiment.

FIG. 5 illustrates an example of receiving mixed audio data through a media session of a mono channel structure according to at least one example embodiment, and FIG. 6 illustrates an example of receiving mixed audio data through a media session of a multichannel structure according to at least one example embodiment.

FIG. 5 illustrates an example in which a media session in a direction from the mixer 311 to the client device 3 323 is set in a mono channel structure and the mixer 311 mixes audio data of the client device 1 321 and audio data of the client device 2 322 and transfers the mixed audio data to the client device 3 323 through the media session of the mono channel structure. In the example embodiment, the mixer 311 may generate a third packet 531 for a mono channel by mixing a first packet 511 from the client device 1 321 and a second packet 521 from the client device 2 322 and may transfer the generated third packet 531 to the client device 3 323. Further, the mixer 311 may generate a sixth packet 532 for the mono channel by mixing a fourth packet 512 from the client device 1 321 and a fifth packet 522 from the client device 2 322 and may transfer the generated sixth packet 532 to the client device 3 323. In this case, because the mixer 311 transfers the third packet 531 and the sixth packet 532 mixed for the mono channel, the client device 3 323 may not individually control the audio data from the client device 1 321 and the audio data from the client device 2 322.

FIG. 6 illustrates an example in which a media session in a direction from the mixer 311 to the client device 3 323 is set in a multichannel structure and the mixer 311 mixes audio data of the client device 1 321 and audio data of the client device 2 322 and transfers the mixed audio data to the client device 3 323 through the media session of the multichannel structure. In the example embodiment, the mixer 311 may generate a seventh packet 611 for a multichannel by mixing the first packet 511 from the client device 1 321 and the second packet 521 from the client device 2 322 and may transfer the seventh packet 611 to the client device 3 323. Further, the mixer 311 may generate an eighth packet 612 for the multichannel by mixing the fourth packet 512 from the client device 1 321 and the fifth packet 522 from the client device 2 322 and may transfer the generated eighth packet 612 to the client device 3 323. In this case, because the mixer 311 transfers the seventh packet 611 and the eighth packet 612 mixed for the multichannel structure, the client device 3 323 may individually control the audio data from the client device 1 321 and the audio data from the client device 2 322.

Figure 7:
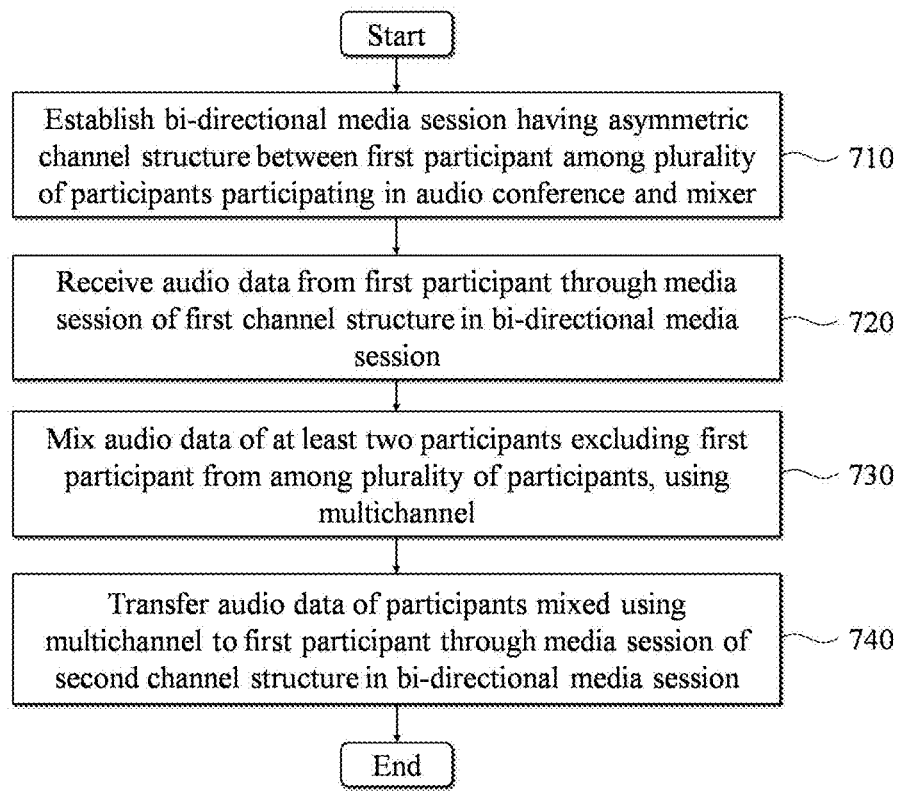
FIG. 7 is a flowchart illustrating an example of an audio control method of a server according to at least one example embodiment.

FIG. 7 is a flowchart illustrating an example of an audio control method of a server according to at least one example embodiment. The audio control method according to the example embodiment may be performed by the computer apparatus 200 that implements a server for an audio conferencing service. For example, the server may be an entity that provides the audio conferencing service. In this case, the processor 220 of the computer apparatus 200 may be configured to execute a control instruction according to a code of at least one program or a code of an OS included in the memory 210. Here, the processor 220 may control the computer apparatus 200 to perform operations 710 to 740 included in the audio control method of FIG. 7 in response to a control instruction provided from a code stored in the computer apparatus 200.

Referring to FIG. 7, in operation 710, the computer apparatus 200 may establish a bi-directional media session having an asymmetric channel structure between a first participant among a plurality of participants participating in an audio conference and a mixer. Here, the audio conference may correspond to a single audio conference instance, and the mixer may be a software module generated by the computer apparatus 200. Further, the plurality of participants may be clients that participate in the same audio conference instance among clients identified based on an account of the audio conferencing service.

Here, although the computer apparatus 200 may establish the bi-directional media session having the asymmetric channel structure for all of the participants, it is possible to establish the bi-directional media session having the asymmetric channel structure with respect to only a participant that desires to individually control audio data for each of the participants.

In one example embodiment, the asymmetric channel structure may include a first channel structure including a mono channel structure and a second channel structure including a multichannel structure depending on some example embodiments. That is, the bi-directional media session of the asymmetric channel structure in which a media session in a direction from the first participant to the mixer and a media session in a direction from the mixer to the first participant are in different channel structures may be established between the first participant and the mixer. Here, because the first participant transmits its audio data to the mixer, a media session of the first channel structure may be set as the media session in the direction from the first participant to the mixer. Further, because the mixer may transmit audio data of a plurality of participants to the first participant, a media session of the second channel structure may be set as the media session in the direction from the mixer to the first participant.

To establish the bi-directional media session of the asymmetric channel structure, the computer apparatus 200 may determine at least one of a channel type, a channel coding scheme, and a processing unit (e.g., unit or size of audio data) for each direction by exchanging media processing information with the first participant.

Here, the channel type defines a type of a channel and a number of channels. The type of the channel may include a fixed channel and a variable channel. The fixed channel may refer to a type in which a number of channels is fixed. The variable channel may refer to a type in which a number of channels is variable. For example, in a transfer protocol of a real-time transfer protocol (RTP), a variable channel of which a number of channels is variable up to maximum 15 channels may be used. That is, in operation 710, the computer apparatus 200 may determine a channel type that is one of the fixed channel and the variable channel and a number of channels. If a separate channel type is not determined, "fixed 1" having a single fixed channel may be determined as a default.

In the case of a multichannel, the channel coding scheme may define a coding scheme of a multichannel in a payload. If the channel type is "fixed 1", it represents a mono channel and thus, it may be meaningless to determine the channel coding scheme. The channel coding scheme may include a codec coding scheme that uses a codec supporting a multichannel encoding and an iterated coding that represents a multichannel based on a processing unit. That is, if the media session of the second channel structure is set to the multichannel in operation 710, the computer apparatus 200 may determine a channel coding scheme as one of a codec coding that uses a codec supporting a multichannel encoding and an iterated coding that represents a multichannel based on a processing unit of audio data.

As described above, the processing unit may be determined to use an iterated coding scheme as a basic processing unit of audio data. That is, if the iterated coding is used as the channel coding scheme, the computer apparatus 200 may determine a processing unit of audio data for iterated coding.

In operation 720, the computer apparatus 200 may receive audio data from the first participant through a media session of a first channel structure in the bi-directional media session. As described above, the first channel structure may include a mono channel structure and may represent a case in which the channel type is "fixed 1". As described above, if the channel type is "fixed 1", it may be meaningless to determine the channel coding scheme. Therefore, there is no need to determine the processing unit.

In operation 730, the computer apparatus 200 may mix audio data of at least two participants, excluding the first participant, from among the plurality of participants, using a multichannel. If only two participants participate in an audio conference instance, the multichannel is meaningless. However, at least three participants participate in the audio conference instance, the first participant may receive audio data from at least two participants and the multichannel may be used. In this case, the computer apparatus 200 may mix audio data received from at least two participants excluding the first participant, using the multichannel. Here, the mixed audio data may be coded through the channel coding scheme determined in operation 710.

In operation 740, the computer apparatus 200 may transfer audio data of participants mixed using the multichannel to the first participant through a media session of a second channel structure in the bi-directional media session. The audio data mixed using the multichannel may be transferred to the first participant through the media session of the second channel structure, that is, the media session of the multichannel structure. In this case, because audio data of participants is identifiable for each channel, the first participant may individually control audio data of each of other participants.

For example, the computer apparatus 200 may transmit audio data of n participants as at least two participants, excluding the first participant, from among the plurality of participants through n channels as the multichannel. Here, n denotes a natural number of 2 or more. In this case, the first participant may control the individual audio data of the n participants, as the at least two participants excluding the first participant, for each of the participants. As another example, the at least two participants may be grouped into m groups. Here, m denotes a natural number of 2 or more. In this case, the computer apparatus 200 may transmit audio data of participants mixed for each group through m channels formed for the m groups. In this case, the first participant may control the audio data mixed for each group based on a group unit.

Meanwhile, the first participant and the mixer may communicate with each other according to a transfer protocol of RTP. Here, if the media session of the second channel structure is set to the multichannel, an order of a channel may be represented through an order of a synchronization source (SSRC) represented in a contributing source (CSRC) desired (or alternatively, predefined) according to the transfer protocol of the RTP and a number of channels may be represented through a CSRC count (CC) defined according to the transfer protocol of the RTP. The SSRC denotes a source of audio data, that is, a participant that desires to transfer audio data to the first participant, and the CSRC denotes a list of SSRCs. That is, the order of a corresponding SSRC represented in the CSRC may represent an order of a channel. Further, the CC denotes a number of SSRCs and the CC may correspond to a number of channels.

Figure 8:
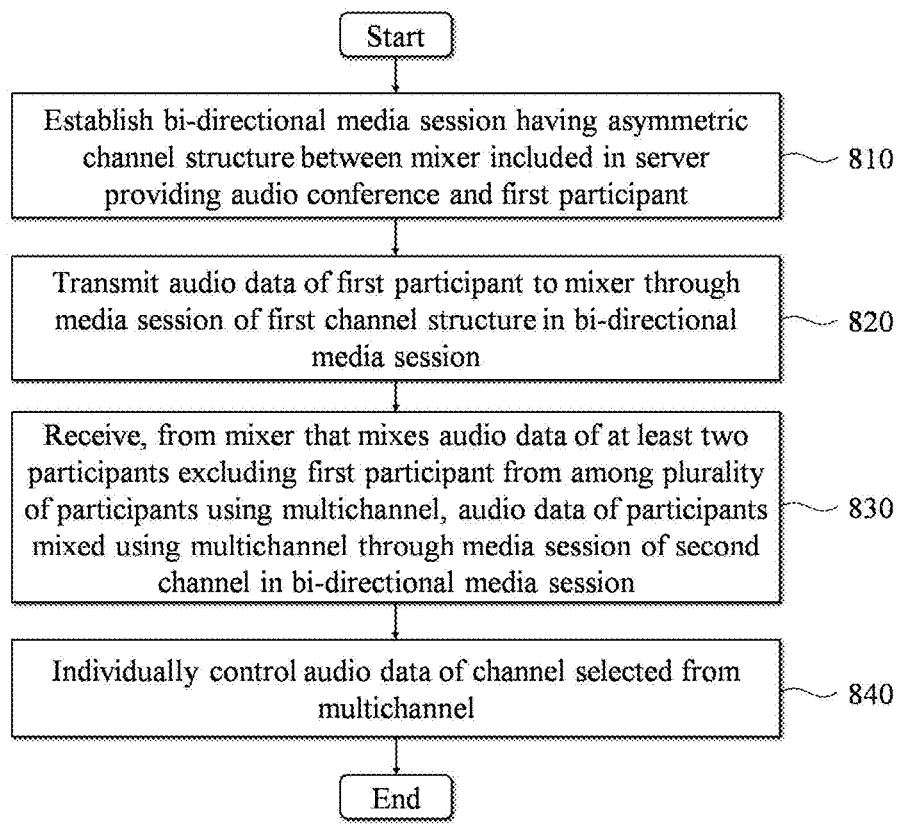
FIG. 8 is a flowchart illustrating an example of an audio control method of a client according to at least one example embodiment.

FIG. 8 is a flowchart illustrating an example of an audio control method of a client according to at least one example embodiment. The audio control method according to the example embodiment may be performed by the computer apparatus 200 that implements a client for an audio conferencing service. For example, a server may be an entity that participates in an audio conference instance. In this case, the processor 220 of the computer apparatus 200 may be configured to execute a control instruction according to a code of at least one program or a code of an OS included in the memory 210. Here, the processor 220 may control the computer apparatus 200 to perform operations 810 to 840 included in the audio control method of FIG. 8 in response to a control instruction provided from a code stored in the computer apparatus 200.

Referring to FIG. 8, in operation 810, the computer apparatus 200 may establish a bi-directional media session having an asymmetric channel structure between a mixer included in a server providing an audio conference and a first participant. Establishing the bi-directional media session having the asymmetric channel structure between the mixer and the first participant is described with reference to FIG. 7. The mixer and the first participant may determine at least one of a channel type, a channel coding scheme, and a processing unit by exchanging media processing information such as a codec.

In operation 820, the computer apparatus 200 may transmit audio data of the first participant to the mixer through a media session of a first channel structure in the bi-directional media session. As described above, the first channel structure may include a mono channel structure. The computer apparatus 200 of the example embodiment that is a client device of the first participant may transmit the audio data of the first participant to the mixer through the media session of the mono channel structure.

In operation 830, the computer apparatus 200 may receive, from the mixer that mixes audio data of at least two participants, excluding the first participant, from among the plurality of participants using a multichannel, audio data of participants mixed using the multichannel through a media session of a second channel in the bi-directional media session. The second channel structure may include the multichannel structure. Here, the computer apparatus 200 may receive audio data of the multichannel for audio data of each of the at least two participants through the media session of the multichannel structure. For example, the computer apparatus 200 may receive audio data of n participants as at least two participants through n channels as the multichannel. Here, n denotes a natural number of 2 or more. As another example, the computer apparatus 200 may group at least two participants into at least two groups and may receive audio data corresponding to each group through the media session of the multimedia channel. For example, considering an audio conference instance A in which participants 1, 2, 3, 4, 5, 6, 7, and 8 participate, the participant 1 may set a group 1 that includes the participants 2, 3, and 4 and a group 2 that includes the participants 5, 6, 7, and 8. In this case, the server may receive settings on information about the group 1 and the group 2 from the participant 1 in association with the audio conference instance A. The mixer included in the server may set a media session that includes a first channel for mixing and transferring audio data of the participants 2, 3, and 4 of the group 1 and a second channel for mixing and transferring audio data of the participant 5, 6, 7, and 8 of the group 2, with respect to the participant 1 in association with the audio conference instance A. In this case, the participant 1 may individually control the audio data of the group 1 and the audio data of the group 2 in the audio conference instance A. An example embodiment of controlling audio data for each group through a multichannel including at least three channels by grouping other participants into at least three groups may be easily understood from the aforementioned description.

In operation 840, the computer apparatus 200 may individually control audio data of a channel selected from the multichannel. For example, the computer apparatus 200 may control a volume of the audio data of the selected channel, may remove noise in the audio data of the selected channel, or may modulate the audio data of the selected channel. Accordingly, the computer apparatus 200 may provide a user, for example, the first participant, with a user interface that includes at least one of a function of controlling the volume of the audio data of the selected channel, a function of removing noise in the audio data of the selected channel, and a function of modulating the audio data of the selected channel.

According to some example embodiments, a user in a listener's position may control audio for each audio data source while using mixing in an audio conference.

The systems or apparatuses described above may be implemented using hardware components, software components, and/or a combination thereof. For example, the apparatuses and the components described herein may be implemented using one or more general-purpose or special purpose computers, such as, for example, a processing device, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An audio control method of a computer apparatus comprising at least one processor, the audio control method comprising:
    identifying, by the at least one processor, at least one first participant among a plurality of participants participating in an audio conference to allow individual control of audio data from each of at least two other participants among the plurality of participants;
    establishing, by the at least one processor, a first bi-directional media session having an asymmetric channel structure between the first participant and a mixer, the asymmetric channel structure including a mono channel structure and a multichannel structure;
    establishing, by the at least one processor, a second bi-directional media session between each of the rest of the participants excluding the first participant and the mixer, the second bi-directional media session including a mono channel structure and devoid of a multichannel structure;
    receiving, by the at least one processor, first audio data from the first participant through a media session of the mono channel structure in the first bi-directional media session;
    mixing, by the at least one processor, second audio data from the at least two other participants for a multichannel; and
    transferring, by the at least one processor, the mixed second audio data through a media session of the multichannel structure in the first bi-directional media session so that the first participant individually controls the second audio data of each of the at least two other participants included in the mixed second audio data.

2. The audio control method of claim 1, wherein the establishing the first bi-directional media session comprises determining at least one of a channel type, a channel coding scheme, and a processing unit of audio data for each direction by exchanging media processing information with the first participant.

3. The audio control method of claim 1, wherein the establishing the first bi-directional media session comprises determining a channel type between a fixed channel and a variable channel and a number of channels.

4. The audio control method of claim 1, wherein the establishing the first bi-directional media session comprises determining a channel coding scheme as one of a codec coding that uses a codec supporting a multichannel encoding and an iterated coding that represents the multichannel based on a processing unit of audio data, in response to setting the media session of the multichannel structure to the multichannel.

5. The audio control method of claim 1, wherein the establishing the first bi-directional media session comprises determining a processing unit of audio data for an iterated coding in response to using the iterated coding as a channel coding scheme.

6. The audio control method of claim 1, wherein
    the first participant and the mixer communicate according to a transfer protocol of a real-time transport protocol (RTP), and
    in response to setting the media session of the multichannel structure to the multichannel, an order of a channel is represented through an order of a synchronization source (SSRC) represented in a contributing source (CSRC) defined according to the transfer protocol of the RTP, and a number of channels is represented through a CSRC count defined according to the transfer protocol of the RTP.

7. The audio control method of claim 1, wherein the transferring comprises transmitting the mixed second audio data of the at least two other participants including n participants, through n channels as the multichannel, where n denotes a natural number of 2 or more.

8. The audio control method of claim 1, further comprising:
    classifying the at least two other participants into m groups, where m denotes a natural number of 2 or more,
    wherein the transferring comprises transmitting the mixed second audio data of the at least two participants for each group through m channels formed for the m groups.

9. An audio control method of a computer apparatus comprising at least one processor, the audio control method comprising:

establishing, by the at least one processor, a bi-directional media session having an asymmetric channel structure between a mixer included in a server providing an audio conference and a first participant;

transmitting, by the at least one processor, first audio data of the first participant to the mixer through a media session of a mono channel structure in the bi-directional media session;

receiving, by the at least one processor, from the mixer that is configured to mix two or more pieces of audio data of a plurality of participants using a multichannel, second audio data of at least two participants, from among the plurality of participants, mixed using the multichannel through a media session of a multichannel structure in the bi-directional media session, the at least two participants excluding the first participant;

providing, by the at least one processor, a user interface including at least one of a function of controlling a volume of a specific piece of the mixed second audio data of a select channel, a function of removing noise in the specific piece of the mixed second audio data of the select channel, and a function of modulating the specific piece of the mixed second audio data of the select channel; and individually controlling, by the at least one processor, the specific piece of the mixed second audio data of the select channel selected from the multichannel.

10. The audio control method of claim 9, wherein the establishing comprises determining at least one of a channel type, a channel coding scheme, and a processing unit of audio data for each direction by exchanging media processing information with the mixer.

11. The audio control method of claim 9, wherein the receiving comprises receiving the mixed second audio data of the at least two participants including n participants, through n channels as the multichannel, where n denoting a natural number of 2 or more.

12. The audio control method of claim 9, further comprising:

classifying the at least two participants into m groups, where n denotes a natural number of 2 or more, wherein the receiving comprises receiving the mixed second audio data of the at least two participants mixed for each group through m channels formed for the m groups.

13. The audio control method of claim 9, wherein the individually controlling comprises at least one of controlling a volume of the specific piece of the mixed second audio data of the select channel, removing noise in the specific piece of the mixed second audio data of the select channel, and modulating the specific piece of the mixed second audio data of the select channel.

14. A non-transitory computer-readable record medium storing instructions that, when executed by at least one processor, cause a computer apparatus to implement the audio control method of claim 1.

15. A computer apparatus comprising:

at least one processor configured to execute a computer-readable instruction, wherein the at least one processor is configured to cause the computer apparatus to, identify at least one first participant among a plurality of participants participating in an audio conference to allow individual control of audio data from each of at least two other participants among the plurality of participants, establish a first bi-directional media session having an asymmetric channel structure between the first participant and a mixer, the asymmetric channel structure including a mono channel structure and a multichannel structure, establish, by the at least one processor, a second bi-directional media session between each of the rest of the participants excluding the first participant and the mixer, the second bi-directional media session including a mono channel structure and devoid of a multichannel structure, receive first audio data from the first participant through a media session of the mono channel structure in the first bi-directional media session, mix second audio data from the at least two other participants for a multichannel, and transfer the mixed second audio data through a media session of the multichannel structure in the first bi-directional media session so that the first participant individually controls the second audio data of each of the at least two other participants included in the mixed second audio data.

16. The computer apparatus of claim 15, wherein the at least one processor is configured to cause the computer apparatus to establish the first bi-directional media session by determining at least one of a channel type, a channel coding scheme, and a processing unit of audio data for each direction by exchanging media processing information with the mixer.

17. The computer apparatus of claim 15, wherein the at least one processor is configured to cause the computer apparatus to establish the first bi-directional media session by determining a channel coding scheme as one of a codec coding that uses a codec supporting a multichannel encoding and an iterated coding that represents the multichannel based on a processing unit of audio data, in response to setting the media session of the multichannel structure to the multichannel.

18. The computer apparatus of claim 15, wherein the at least one processor is configured to cause the computer apparatus to establish the first bi-directional media session by determining a processing unit of audio data for an iterated coding in response to using the iterated coding as a channel coding scheme.

19. The computer apparatus of claim 15, wherein the at least one processor is configured to cause the computer apparatus to transfer the mixed second audio data by transmitting the mixed second audio data of the at least two other participants including n participants, through n channels as the multichannel, where n denotes a natural number of 2 or more.

* * * * *